(12) United States Patent
Bittmann et al.

(10) Patent No.: US 11,907,336 B2
(45) Date of Patent: Feb. 20, 2024

(54) VISUAL LABELING FOR MACHINE LEARNING TRAINING

(71) Applicant: SAP SE, Walldorf (DE)

(72) Inventors: Ran M. Bittmann, Tel Aviv (IL); Hans-Martin Ramsl, Mannheim (DE)

(73) Assignee: SAP SE, Walldorf (DE)

( * ) Notice: Subject to any disclaimer, the term of this patent is extended or adjusted under 35 U.S.C. 154(b) by 352 days.

(21) Appl. No.: 17/516,948

(22) Filed: Nov. 2, 2021

(65) Prior Publication Data

US 2023/0133030 A1    May 4, 2023

(51) Int. Cl.
| | |
|---|---|
| G06K 9/62 | (2022.01) |
| G06F 18/21 | (2023.01) |
| G06F 18/214 | (2023.01) |
| G06F 18/2411 | (2023.01) |
| G06K 19/06 | (2006.01) |
| G06V 30/19 | (2022.01) |

(52) U.S. Cl.
CPC .......... *G06F 18/217* (2023.01); *G06F 18/214* (2023.01); *G06F 18/2411* (2023.01); *G06K 19/06028* (2013.01); *G06K 19/06037* (2013.01); *G06V 30/19153* (2022.01)

(58) Field of Classification Search
CPC .. G06F 18/217; G06F 18/2411; G06F 18/214; G06V 30/19153; G06K 19/06028; G06K 19/06037
See application file for complete search history.

(56) References Cited

U.S. PATENT DOCUMENTS

| | | | |
|---|---|---|---|
| 11,577,170 B1 * | 2/2023 | Hameed | ................ A63F 13/533 |
| 2020/0327674 A1 * | 10/2020 | Yang | ......................... G06T 7/60 |
| 2020/0341114 A1 * | 10/2020 | Acharya | ............... G01S 13/723 |

\* cited by examiner

*Primary Examiner* — David F Dunphy
(74) *Attorney, Agent, or Firm* — SCHWEGMAN LUNDBERG & WOESSNER, P.A.

(57) ABSTRACT

Systems, methods, and computer-readable media are disclosed for visual labeling of training data items for training a machine learning model. Training data items may be generated for training the machine learning model. Visual labels, such as QR codes, may be created for the training data items. The creation of the training data item and the visual label may be automated. The visual labels and the training data items may be combined to obtain a labeled training data item. The labeled training data item may comprise a separator to distinguish the training data item from the visual label. The labeled training data item may be used for training and validation of the machine learning model. The machine learning model may analyze the training data item, attempt to identify the training data item, and compare the identification against the embedded label.

20 Claims, 3 Drawing Sheets

VISUAL LABELING FOR MACHINE LEARNING TRAINING

TECHNICAL FIELD

Embodiments generally relate to machine learning model training and validation. More specifically, embodiments relate to systems and methods for creating labeled training data items comprising a training data item and a visual label for the training data item in a single image to facilitate training and validation of machine learning models.

RELATED ART

In order to effectively train a machine learning model, the machine learning model often needs to be trained on large amounts of training data. For supervised and semi-supervised training of machine learning models, training data items in the training data set need to be labeled such that the machine learning model can learn to associate the labels with the training data item. For example, a machine learning model used to classify animals may be fed pictures of lions, tigers, and bears with the images labeled accordingly. However, labels for training data are often stored separately from the training data itself, such as in a separate file or folder. The separation of labels from their corresponding training data items often proves inconvenient for transferring training data. The files storing the training data items and the visual labels may become separated when transferring files between systems. Additionally, while file formats such as EXIF or XMP may allow for the embedding of metadata, when the training data item is altered, the embedded metadata might change and is not supported by all visual formats. Therefore, the metadata cannot be used to store classifications of altered training data items. Alteration of training data items, such as blurring of an image, allows for the machine learning model to learn to classify imperfect data items. Thus, embedding a label in a metadata file prevents a robust data set comprising alterations of training data items from being created. Further, training data items are often manually labeled which requires substantial time and cost investment that increases as both the complexity of the training data and the size of the training data set increases.

Accordingly, a need exists for automatic generation of labeled training data items comprising a training data item and a corresponding visual label, regardless of the image format, as part of the visual image for training, validating, and testing of machine learning models.

SUMMARY

Disclosed embodiments address the above-mentioned problems by providing systems and methods for visual labeling of training data for training machine learning models. Training data items may be automatically generated and/or retrieved from a database. For each training data item, a visual label, such as a quick response (QR) code, may be generated and attached to the training data item, forming a labeled training data item. The labeled training data item may comprise a pre-defined delimiter to separate the training data item from the visual label. Once created, the labeled training data item may be provided to a machine learning model for training, validating, or testing. The machine learning model may analyze the training data item, attempt to classify the training data item, and compare the classification against the visual label. The weights, biases, and other parameters of the machine learning model may be adjusted based on the comparison. By combining the label with the training data item into the same image, issues arising from storing training data and labels separately may be avoided.

A first embodiment is directed to one or more non-transitory computer-readable media storing computer-executable instructions that, when executed by a processor, perform a method for machine learning training with embedded visual labels, the method comprising generating a plurality of training data items for training a machine learning model, in response to generating the plurality of training data items, creating a plurality of visual labels, each visual label in the plurality of visual labels identifying a training data item of the plurality of training data items, attaching each visual label in the plurality of visual labels to a training data item in the plurality of training data items to obtain a plurality of labeled training data items, for each labeled training data item in the plurality of labeled training data items, defining a separator to separate the visual label from the training data item, providing the plurality of labeled training data items to the machine learning model for training, and for each labeled training data item in the plurality of labeled training data items: receiving, from the machine learning model, a classification of the training data item, and comparing the classification of the training data item against the machine learning model.

A second embodiment is directed to a system for machine learning training with embedded visual labels, the system comprising a processor, a data store, and one or more non-transitory computer-readable media storing computer-executable instructions that, when executed by the processor, perform a method for machine learning training with embedded visual labels, the method comprising retrieving, from the data store, a training data set, the training data set comprising a plurality of training data items and a plurality of classifications for the plurality of training data items, creating a plurality of visual labels, each visual label of the plurality of visual labels representing a classification of the plurality of classifications for the plurality of training data items, attaching each visual label of the plurality of visual labels to a training data item of the plurality of training data items to obtain a plurality of labeled training data items, providing the plurality of labeled training data items to a machine learning model for training, and for each labeled training data item of the plurality of labeled training data items: receiving, from the machine learning model, a classification of the training data item, and comparing the classification against the visual label.

A third embodiment is directed to a computer-implemented method for machine learning training using embedded visual labels, the method comprising generating a plurality of training data items for training a machine learning model, in response to generating the plurality of training data items, creating a plurality of visual labels, each visual label in the plurality of visual labels identifying a training data item of the plurality of training data items, attaching each visual label in the plurality of visual labels to a training data item in the plurality of training data items to obtain a plurality of labeled training data items, for each labeled training data item in the plurality of labeled training data items, defining a separator to separate the visual label from the training data item, providing the plurality of labeled training data items to the machine learning model for training, and for each labeled training data item in the plurality of labeled training data items: receiving, from the machine learning model, a classification of the training data item, and comparing the classification of the training data item against the machine learning model.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments are described in detail below with reference to the attached drawing figures, wherein.

Figure 1:
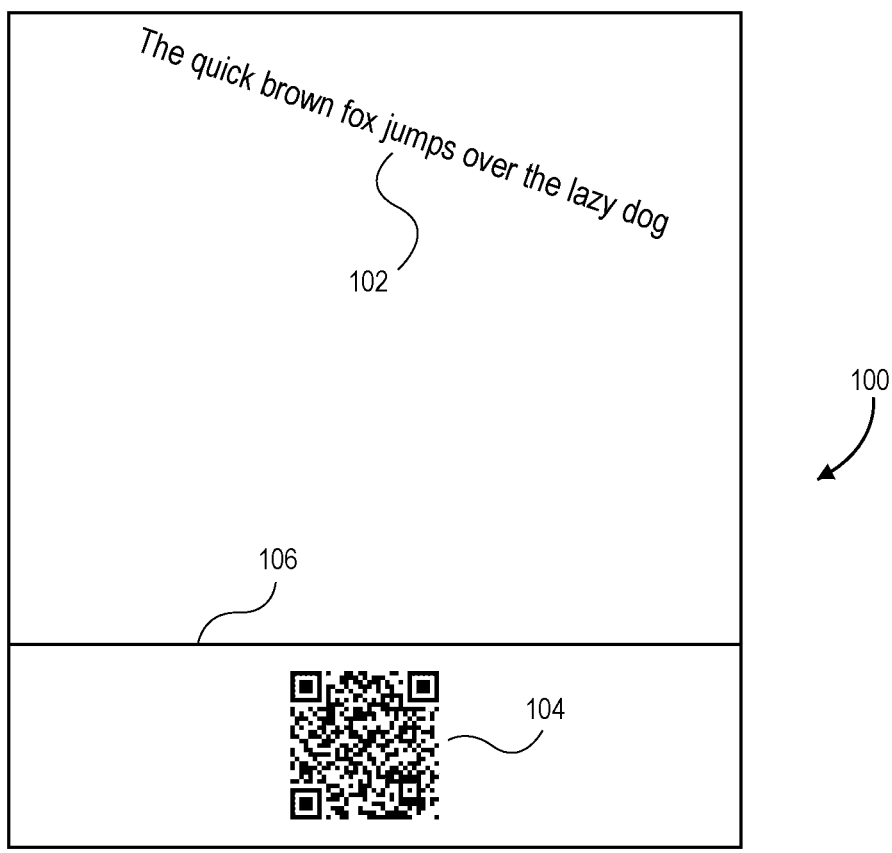
FIG. 1 illustrates an exemplary labeled training data item for certain embodiments.

The drawing figures do not limit the invention to the specific embodiments disclosed and described herein. The drawings are not necessarily to scale, emphasis instead being placed upon clearly illustrating the principles of the disclosure.

DETAILED DESCRIPTION

Systems and methods for training machine learning models using visually labeled training data items are described herein. Training data items for training, validating, testing, or a combination thereof, of a machine learning model may be generated. For each training data item, a visual label may be created identifying the training data item. The visual label may be a QR code, a bar code, or any other machine-readable optical label. The visual label may be embedded with the training data item to obtain a labeled training data item comprising the visual label and the training data item in the same image. In some embodiments, the labeled training data items comprise a separator to separate the training data item from the visual label. The labeled training data items may then be fed to a machine learning model for training. During training, the machine learning model may attempt to classify the training data item and compare the classification against the visual label. In some embodiments, the labeled training data items are used to train an optical character recognition system.

The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the disclosed invention in sufficient detail to enable those skilled in the art to practice the invention. Other embodiments can be utilized, and changes can be made without departing from the claimed scope of the invention. The following detailed description is, therefore, not to be taken in a limiting sense. The scope of embodiments is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

FIG. 1 illustrates a labeled training data item 100 for some embodiments. In some embodiments, labeled training data item 100 comprises training data item 102, visual label 104, and separator 106. In some embodiments, labeled training data item 100 is stored as an image file such as a JPEG, PNG, JPG, TIFF, BMP, PDF, and the like, that is provided to a machine learning model for training, validating, or testing. For example, labeled training data item 100 may be provided to an OCR model for training. In some embodiments, various neural networks and deep learning algorithms are utilized such as, but not limited to, recurrent neural networks (RNNs), convolutional neural networks (CNNs), or generative adversarial networks (GANs). In some embodiments, labeled training data item 100 can be used to facilitate supervised training, semi-supervised training, weak supervision training, and the like of machine learning models.

As shown, training data item 102 comprises an alphanumeric string that may be used to train an OCR algorithm, for example. In some embodiments, the alphanumeric string is an automatically generated, random string. In some embodiments, training data item 102 comprises an image, such as an image of text, an image of an animal, an image of a person for training facial recognition, or any other image type for training a related machine learning model. In some embodiments, training data item 102 comprises scanned images of receipts, invoices, and the like. Alternatively, or additionally, training data item 102 may comprise textual, numeric, video, or audio data. In some embodiments, training data item 102 is retrieved from a known repository or dataset for training machine learning models, such as the ImageNet database for training object recognition algorithms, or the MNIST database for training character recognition models. The known repository may have an associated set of classifications/identifications for training data item 102 that may be used for generation of visual label 104, as will be discussed in further detail below.

Training data item 102 may be manipulated to challenge the machine learning model. For example, if training data item 102 comprises an image of text for training OCR, training data item 102 may be rotated, blurred, smudged, shifted, stretched, bolded, italicized, struck through, or have other like distortions applied to train the machine learning model to recognize text in images having poor image quality. In some embodiments, the font of training data item 102 is changed to train the machine learning model to recognize multiple fonts. Similarly, training data item 102 may be translated to a different language. In still other embodiments, paper degradations can be simulated, such as adding simulated tears, folds, and the like to training data item 102. As another example, the text string could be edited (e.g., insertion, deletion, substitution of text) to train the machine learning model. For example, training data item 102 could be altered to read "The quick br0wn fox jumps 0ver the lazy d0g," to train the machine learning model to recognize differences between "Os" and "0s." In some embodiments, text edits are made to mimic typos that may be made on a standard QWERTY keyboard, such as substituting a character with a character two key spaces away. Alterations may be made to non-pictographic training data items 102 when training the machine learning model for such use cases. Advantageously, training data item 102 may be manipulated within labeled training data item 100 without the manipulation affecting visual label 104. As such, visual label 104 may still maintain the original meaning of training data item 102 even when training data item 102 is altered.

To identify training data item 102, visual label 104 may be created. In some embodiments, visual label 104 is generated automatically without any human interaction required for data labeling. For example, when generating random texts of strings for training data items 102, visual label 104 may be generated automatically to represent the same random string. As another example, when generating labeled training data items 100 from a pregenerated and pre-labeled training dataset, a visual label 104 may be created for each label in the dataset.

In some embodiments, visual label 104 comprises any machine-readable optical label. For example, visual label 104 may comprise a QR code, a one-dimensional bar code, a High Capacity Colored 2-Dimenisonal (HCC2D) code, a Just Another Barcode (JAB) code, or an Aztec code. In some embodiments, visual label 104 stores an alphanumeric string comprising the identification of training data item 102. In some embodiments, a single visual label 104 is reused for multiple training data items 102. For example, if five training data items 102 in a training data set comprise images of a dog, a single visual label 104 may be created and reused for each of the five training data items 102 comprising the image of the dog. In some embodiments, labeled training data item 100 comprises multiple visual labels 104. For example, a training data item 102 may have a generic classification (e.g., dog) and a specific classification (e.g., golden retriever), and each classification may have an associated visual label 104. In some embodiments, training data items 102 have multiple classifications stored in a single visual label 104.

As illustrated in FIG. 1, visual label 104 is positioned substantially in the bottom-center of labeled training data item 100. Broadly, any position of visual label 104 within labeled training data item 100 is considered for embodiments herein. In some embodiments, visual label 104 is disposed at a predefined position of labeled training data item 100. In some embodiments, all labeled training data items 100 in a training data set are the same image size; thus, visual labels 104 may be placed in the same coordinate or pixel location in each labeled training data item 100. In some embodiments, training data items 102 are scaled to match a standardized size for the training data set. In some embodiments, coordinate information of training data item 102 and/or visual label 104 is stored as metadata for labeled training data item 100, such as in an EXIF file. In some embodiments, visual label 104 is disposed on a separate layer or channel of labeled training data item 100. For example, image files may comprise multiple layers or channels in a single image, with various colors displayed on differing layers. As such, in some embodiments, visual label 104 may be disposed on a separate layer of the image. For example, if training data item 102 comprises a greyscale image, visual label 104 may be disposed on an RGB layer or channel of labeled training data item 100. Thus, in some embodiments, the machine learning model may process the greyscale layer to identify training data item 102 and process the RGB layer to compare the identification against visual label 104.

Labeled training data item 100 may also comprise separator 106 such that the machine learning model can distinguish between training data item 102 and visual label 104 when training. Broadly, separator 106 may take any form that is easily detectable by the machine learning model such that it is detectable by the machine learning model which item is training data item 102 and should be classified. In some embodiments, separator 106 is standardized across all labeled training data items 100 in a training data set. As shown, separator 106 may be a substantially horizontal, solid line dividing training data item 102 from visual label 104. In some embodiments, separator 106 may be substantially vertical, diagonal, curved, or any other shape. For example, separator 106 may comprise a box or circle encompassing visual label 104. As another example, separator 106 may instead comprise a dashed or dotted line. Alternatively, or additionally, in some embodiments, separator 106 may comprise a colored line. In some embodiments, separator 106 is omitted and visual label 104 and training data item 102 are separated via other means, such as disposing visual label 104 and training data item 102 on separate layers of labeled training data item 100 as described above. In some embodiments, if training data item 102 and/or visual label 104 comprise greyscale images, a colored separator 106 may be employed. In some embodiments, a separate visual label 104, such as a barcode may be used as a separator 106. In some embodiments, separator 106 comprises a virtual separator. For example, separator 106 may be pre-defined such that any visual content disposed below vertical position 1000 should be read by the machine learning model as a visual label 104. Similarly, as described above, separator 106 may be defined such that any visual content on a RGB layer of labeled training data item 100 should be read by the machine learning model as a visual label 104, and any visual content on a greyscale layer of labeled training data item 100 should be read as training data item 102. Alternatively, separator 106 may be defined such that any content on a RGB layer of labeled training data item 100 should be read by the machine learning model as training data item 102, and any visual content on a greyscale layer of labeled training data item 100 should be read as visual label 104.

Figure 2:
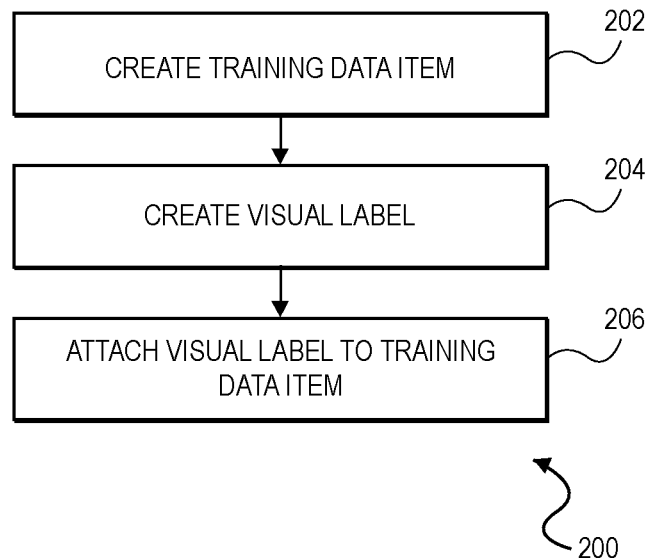
FIG. 2 illustrates an exemplary method for creating labeled training data items for certain embodiments.

FIG. 2 illustrates a method 200 for creating labeled training data items 100 for some embodiments. At step 202, training data item 102 may be created. In some embodiments, training data item 102 is generated from a stored dictionary or database of training data items 102. For example, training data item 102 may be created from a stored database of scanned receipts or invoices. In some embodiments, training data item 102 is created randomly, such as by programmatically generating a random alphanumeric string. Broadly, any method of generating or retrieving a training data item 102 is considered for embodiments herein.

At step 204, visual label 104 may be created for training data item 102. Visual label 104 may comprise the classification(s) of training data item 102. For example, visual label 104 for training data item 102 illustrated in FIG. 1 may store the string "The quick brown fox jumps over the lazy dog." As another example, if training data item 102 comprises an image of a golden retriever, visual label 104 may instead store text of the classification, such as "dog" or "golden retriever," depending on the desired specificity of the machine learning model. In some embodiments, creation of visual label 104 is performed automatically and does not require human-in-the-loop participation. In some embodiments, visual label 104 is created automatically, and a human reviewer ensures visual label 104 was generated correctly. As described above, visual label 104 may be a QR code or another machine-readable optical label that allows for reading of the label by the machine learning model. Visual label 104 may be unaffected by any alterations to training data item 102 such that training data item 102 can be altered within labeled training data item 100 to test the machine learning model on variations of training data items 102 without changing the classification stored in visual label 104.

Next, at step 206, visual label 104 may be attached to training data item 102 to obtain labeled training data item 100. As described above, labeled training data item 100 may also comprise separator 106 to distinguish training data item 102 from visual label 104. Labeled training data item 100 may comprise various image formats such as JPEG, PNG, JPG, TIFF, BMP, PDF, and the like. Method 200 may repeat for each training data item 102 that will be used to train the machine learning model to create a training data set. In some embodiments, training data item 102 is altered and added to the training data set as a separate labeled training data item 100, thus increasing the space of the training set. As described above, the visual label 104 for an altered training data item 102 may maintain the same meaning as the original training data item 102. Once the entire training data set, comprising a plurality of labeled training data items 100, is complete, processing may proceed to method 300.

Figure 3:
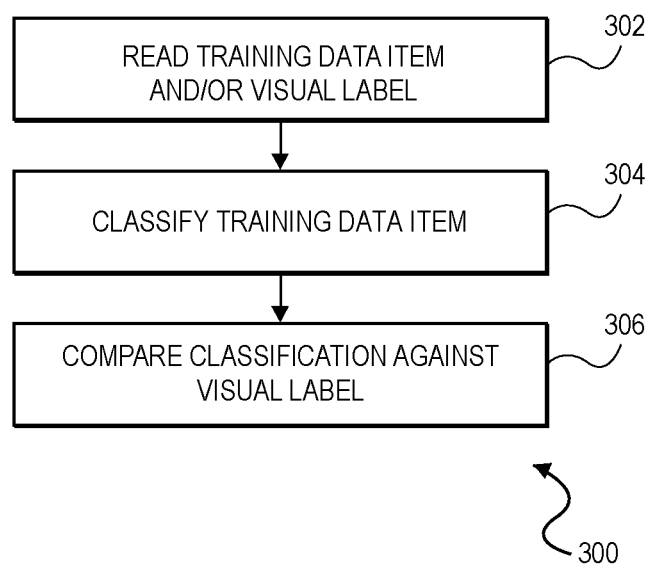
FIG. 3 illustrates an exemplary method for training a machine learning model with the labeled training data items for certain embodiments.

Looking now at FIG. 3, an exemplary method 300 for training a machine learning model with labeled training data items 100 is illustrated. At step 302, the machine learning model may read both training data item 102 and visual label 104 present in labeled training data item 100. In some embodiments, the machine learning model reads only training data item 102 at step 302. In some embodiments, the machine learning model identifies separator 106 to distinguish training data item 102 from visual label 104.

Next, at step 304, the machine learning model may attempt to classify or identify the training data item 102. For example, looking at the labeled training data item 100 in FIG. 1, the machine learning model may perform OCR on training data item 102 and attempt to identify the textual string. As another example, if training data item 102 comprises an image of an animal to be classified, the machine learning model may attempt to classify the animal accordingly.

At step 306, the classification obtained in step 304 may be compared against visual label 104. In some embodiments, if the machine learning model did not read visual label 104 at step 302, the machine learning model reads visual label 104 at step 306. In some embodiments, if the machine learning model incorrectly classified training data item 102, labeled training data item 100 may be inserted back into the training data set for additional training and reclassification of labeled training data item 100. In some embodiments, the weights, biases, parameters, or a combination thereof of the machine learning model are adjusted accordingly after comparing the classification against visual label 104. In some embodiments, if the machine learning model correctly classifies labeled training data item 100, labeled training data item 100 is removed from the training data set. In some embodiments, after correctly classifying training data item 102, training data item 102 is altered, and labeled training data item 100 is shuffled back into the training data set. In some embodiments, if the machine learning model incorrectly classifies training data item 102 and training data item 102 has been altered, the alteration of training data item 102 may be removed or lessened. For example, if the text string of training data item 102 illustrated in FIG. 1 was heavily blurred, and the machine learning model failed to correctly recognize the text, the blurring effect may be lessened and labeled training data item 100 reshuffled into the training data set.

Figure 4:
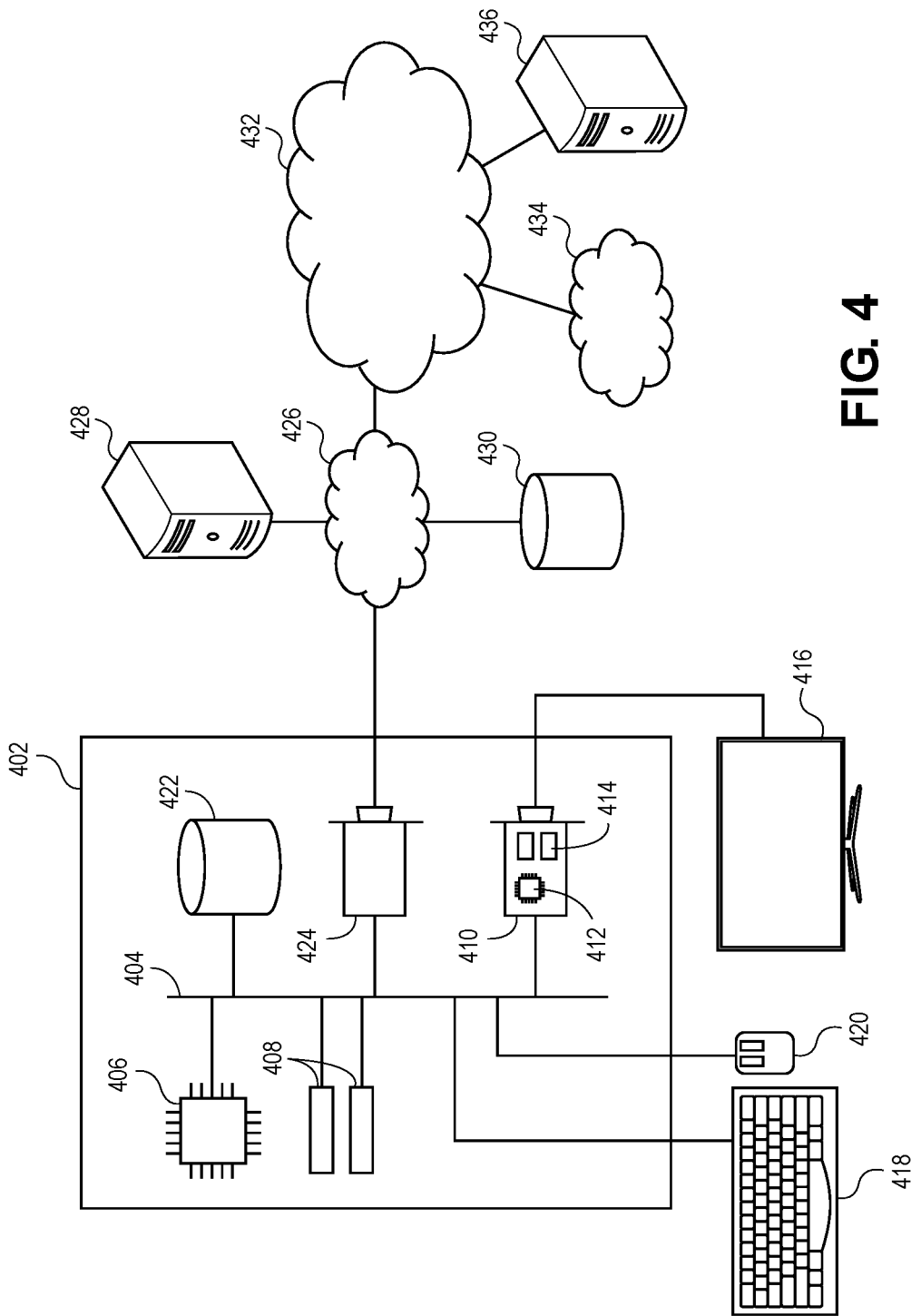
FIG. 4 depicts an exemplary hardware platform for certain embodiments.

Turning now to FIG. 4, in which an exemplary hardware platform for certain embodiments is depicted. Computer 402 can be a desktop computer, a laptop computer, a server computer, a mobile device such as a smartphone or tablet, or any other form factor of general- or special-purpose computing device containing at least one processor. Depicted with computer 402 are several components, for illustrative purposes. In some embodiments, certain components may be arranged differently or absent. Additional components may also be present. Included in computer 402 is system bus 404, via which other components of computer 402 can communicate with each other. In certain embodiments, there may be multiple busses or components may communicate with each other directly. Connected to system bus 404 is central processing unit (CPU) 406. Also attached to system bus 404 are one or more random-access memory (RAM) modules 408. Also attached to system bus 404 is graphics card 410. In some embodiments, graphics card 410 may not be a physically separate card, but rather may be integrated into the motherboard or the CPU 406. In some embodiments, graphics card 410 has a separate graphics-processing unit (GPU) 412, which can be used for graphics processing or for general purpose computing (GPGPU). Also, on graphics card 410 is GPU memory 414. Connected (directly or indirectly) to graphics card 410 is display 416 for user interaction. In some embodiments no display is present, while in others it is integrated into computer 402. Similarly, peripherals such as keyboard 418 and mouse 420 are connected to system bus 404. Like display 416, these peripherals may be integrated into computer 402 or absent. Also connected to system bus 404 is local storage 422, which may be any form of computer-readable media, such as non-transitory computer readable media, and may be internally installed in computer 402 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 424 is also attached to system bus 404 and allows computer 402 to communicate over a network such as network 426. NIC 424 can be any form of network interface known in the art, such as Ethernet, ATM, fiber, Bluetooth, or Wi-Fi (i.e., the Institute of Electrical and Electronics Engineers (IEEE) 802.11 family of standards). NIC 424 connects computer 402 to local network 426, which may also include one or more other computers, such as computer 428, and network storage, such as data store 430. Generally, a data store such as data store 430 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 428, accessible on a local network such as local network 426, or remotely accessible over public Internet 432. Local network 426 is in turn connected to public Internet 432, which connects many networks such as local network 426, remote network 434 or directly attached computers such as computer 436. In some embodiments, computer 402 can itself be directly connected to public Internet 432.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random-access memory associated with one or more physical processor cores.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer-readable media storing computer-executable instructions that, when executed by a processor, perform a method for machine learning training with embedded visual labels, the method comprising:
   generating a plurality of training data items for training a machine learning model;
   in response to generating the plurality of training data items, creating a plurality of visual labels, each visual label in the plurality of visual labels identifying a training data item of the plurality of training data items;
   attaching each visual label in the plurality of visual labels to a training data item in the plurality of training data items to obtain a plurality of labeled training data items;
   for each labeled training data item in the plurality of labeled training data items, defining a separator to separate the visual label from the training data item;
   providing the plurality of labeled training data items to the machine learning model for training; and
   for each labeled training data item in the plurality of labeled training data items:
     receiving, from the machine learning model, a classification of the training data item; and
     comparing the classification of the training data item against the visual label.

2. The media of claim 1, wherein each visual label of the plurality of visual labels comprises a quick response (QR) code.

3. The media of claim 1, wherein the machine learning model is an optical character recognition model.

4. The media of claim 1, wherein the method further comprises:
   altering the training data item within the labeled training data item,
   wherein the altering comprises at least one of a rotation, a smudge, a strikethrough, a bolding, an italicizing, or a blurring of the training data item.

5. The media of claim 1, wherein the method further comprises:
in response to determining that the classification is correct:
altering the training data item to obtain an altered labeled training data item;
receiving, from the machine learning model, a classification of the altered labeled training data item; and
comparing the classification of the altered labeled training data item to the visual label.

6. The media of claim 1, wherein the method further comprises:
in response to determining that the classification is incorrect:
adjusting the machine learning model;
receiving, from the machine learning model, a reclassification of the training data item; and
comparing the reclassification of the training data item to the visual label.

7. The media of claim 1,
wherein the separator comprises one of a solid line disposed between the training data item and the visual label or a dashed line disposed between the training data item and the visual label,
wherein the separator is disposed at a predefined location across the plurality of labeled training data items.

8. A system for machine learning training with embedded visual labels, comprising:
a data store;
a processor; and
one or more non-transitory computer-readable media storing computer-executable instructions that, when executed by the processor, perform a method for machine learning training with embedded visual labels, the method comprising:
retrieving, from the data store, a training data set, the training data set comprising a plurality of training data items and a plurality of classifications for the plurality of training data items;
creating a plurality of visual labels, each visual label of the plurality of visual labels representing a classification of the plurality of classifications for the plurality of training data items;
attaching each visual label of the plurality of visual labels to a training data item of the plurality of training data items to obtain a plurality of labeled training data items;
providing the plurality of labeled training data items to a machine learning model for training; and
for each labeled training data item of the plurality of labeled training data items:
receiving, from the machine learning model, a classification of the training data item; and
comparing the classification against the visual label.

9. The system of claim 8, wherein the method further comprises separating, for each labeled training data item in the plurality of labeled training data items, the visual label from the training data item.

10. The system of claim 8, wherein at least one visual label in the plurality of visual labels comprises a first classification of the training data item and a second classification of the training data item.

11. The system of claim 8, wherein the method further comprises:
for each labeled training data item in the plurality of labeled training data items:
disposing the training data item on a first layer of the labeled training data item; and
disposing the visual label on a second layer of the labeled training data item.

12. The system of claim 8, wherein the method further comprises in response to comparing the classification of the training data item to the visual label, updating the machine learning model.

13. The system of claim 8, wherein the method further comprises storing metadata for a labeled training data item of the plurality of labeled training data items, the metadata comprising a coordinate location of the visual label in the labeled training data item.

14. The system of claim 8, wherein each training data item in the plurality of training data items comprises a scanned image for training an optical character recognition machine learning model.

15. A computer-implemented method for machine learning training with embedded visual labels, the computer-implemented method comprising:
generating a plurality of training data items for training a machine learning model;
in response to generating the plurality of training data items, creating a plurality of visual labels, each visual label of the plurality of visual labels identifying a training data item of the plurality of training data items;
attaching each visual label of the plurality of visual labels to a training data item of the plurality of training data items to obtain a plurality of labeled training data items;
for each labeled training data item of the plurality of labeled training data items, defining a separator to separate the visual label from the training data item;
providing the plurality of labeled training data items to the machine learning model for training; and
for each labeled training data item in the plurality of labeled training data items:
receiving, from the machine learning model, a classification of the training data item; and
comparing the classification against the visual label.

16. The computer-implemented method of claim 15, wherein the visual label comprises a bar code.

17. The computer-implemented method of claim 15,
wherein the training data item and the visual label comprise a greyscale image, and
wherein the separator comprises a colored separator.

18. The computer-implemented method of claim 15, wherein each training data item of the plurality of training data items comprises an alphanumeric string.

19. The computer-implemented method of claim 18, wherein the computer-implemented method further comprises:
for each labeled training data item in the plurality of labeled training data items:
altering the training data item within the labeled training data item to obtain an altered labeled training data item, the altering comprising at least one of a rotation, a smudging, a blurring, or an edit of the alphanumeric string of the alphanumeric string; and
adding the altered labeled training data item to the plurality of labeled training data items to form a training data set.

20. The computer-implemented method of claim 15, wherein the computer-implemented method further comprises disposing each visual label of the plurality of visual labels in a predefined location of the labeled training data item.

* * * * *